United States Patent [19]

Kerr

[11] Patent Number: 4,655,196

[45] Date of Patent: Apr. 7, 1987

[54] THROUGH THE WALL SOLAR COOKER

[76] Inventor: Barbara P. Kerr, P.O. Box 576, Taylor, Ariz. 85939

[21] Appl. No.: 865,764

[22] Filed: May 22, 1986

[51] Int. Cl.⁴ .................................................. F24J 2/02
[52] U.S. Cl. ..................................... 126/451; 126/439; 126/424
[58] Field of Search ............... 126/451, 438, 430, 439, 126/431, 440, 429, 417, 432, 424, 450, 428; 34/93

[56] References Cited

U.S. PATENT DOCUMENTS

| | | | |
|---|---|---|---|
| 2,931,578 | 4/1960 | Thompson | 126/429 |
| 3,841,302 | 10/1974 | Falbel | 126/439 |
| 4,018,212 | 4/1977 | Hein et al. | 126/451 |
| 4,077,391 | 3/1978 | Way, Jr. | 126/451 |
| 4,141,337 | 2/1979 | Bergen | 126/429 |
| 4,149,520 | 4/1979 | Arent | 126/451 |
| 4,203,427 | 5/1980 | Way, Jr. | 126/451 |
| 4,212,288 | 7/1980 | Lipinski | 126/428 |
| 4,236,508 | 12/1980 | Kerr | 126/451 |
| 4,274,397 | 6/1981 | Hill | 126/451 |
| 4,284,067 | 8/1981 | Kilar | 126/438 |
| 4,559,925 | 12/1985 | Snow | 126/431 |

Primary Examiner—James C. Yeung
Attorney, Agent, or Firm—Warren F. B. Lindsley

[57] ABSTRACT

A solar oven or cooker for permanent installation as a kitchen appliance with provision made for collection of solar radiation throughout the daylight hours. Reflective panels are provided for coping with changes in the position of the sun, and with the different requirements of various cooking operations which reflective panels may be fixedly arranged or adjustably positioned by the operator.

14 Claims, 13 Drawing Figures

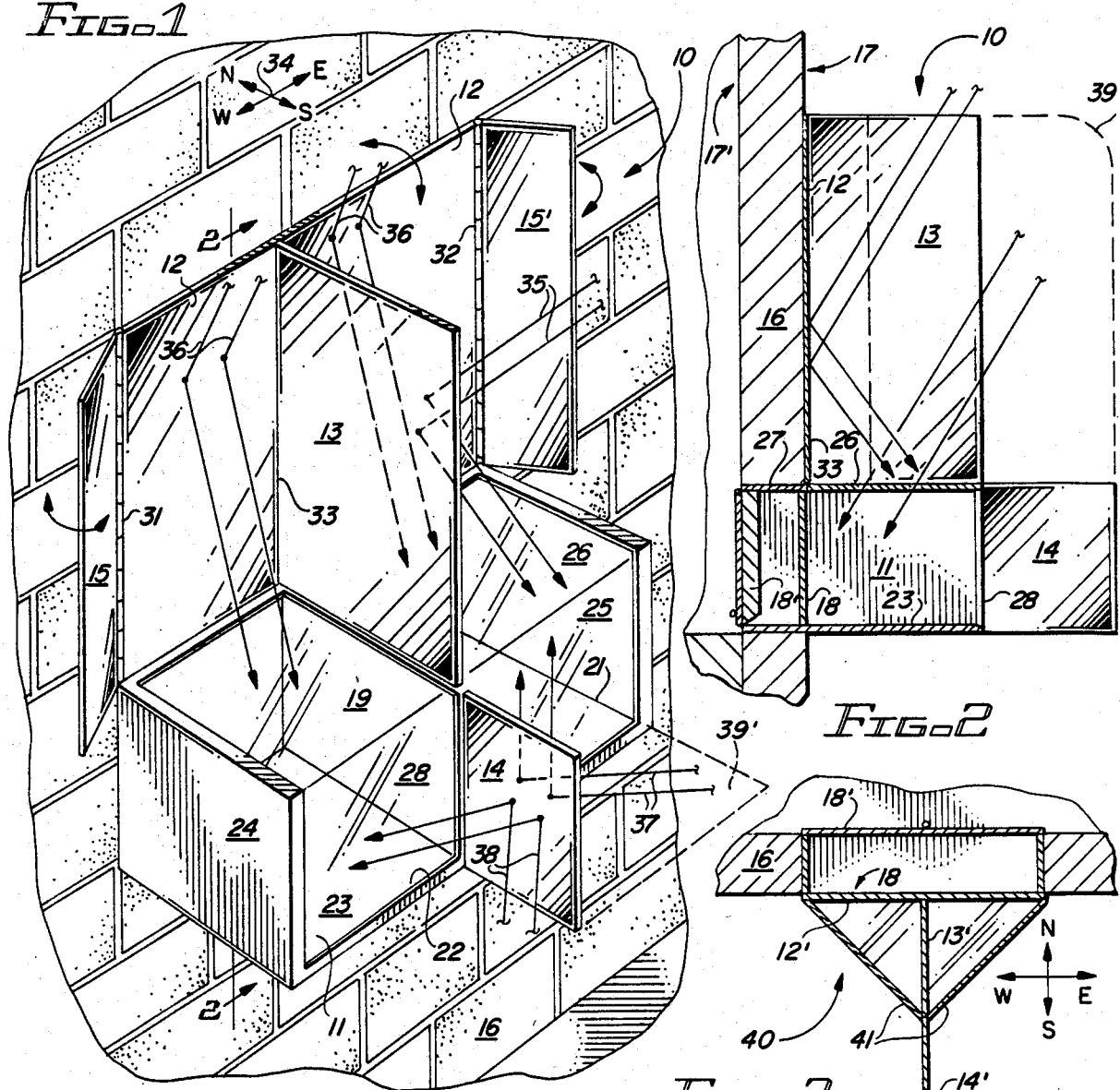
FIG.1
FIG.2
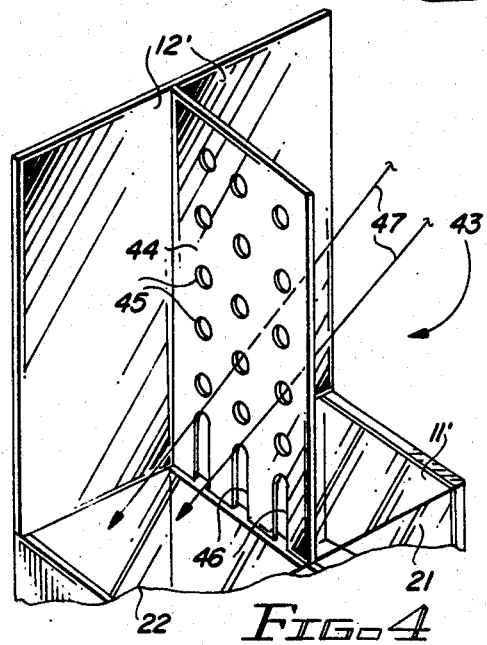
FIG.3
FIG.4
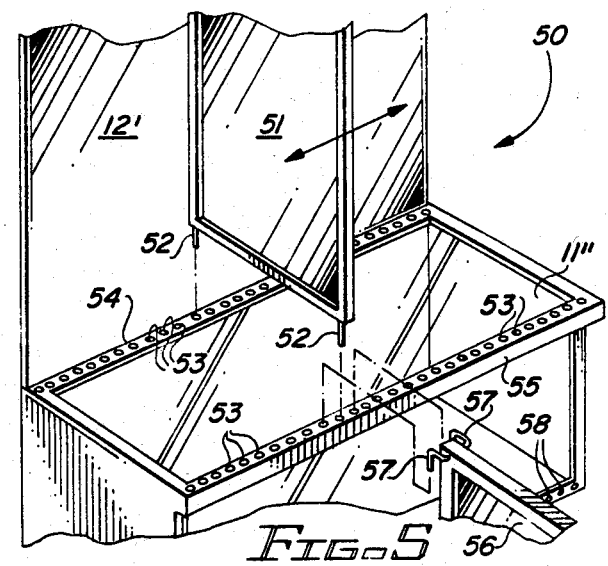
FIG.5

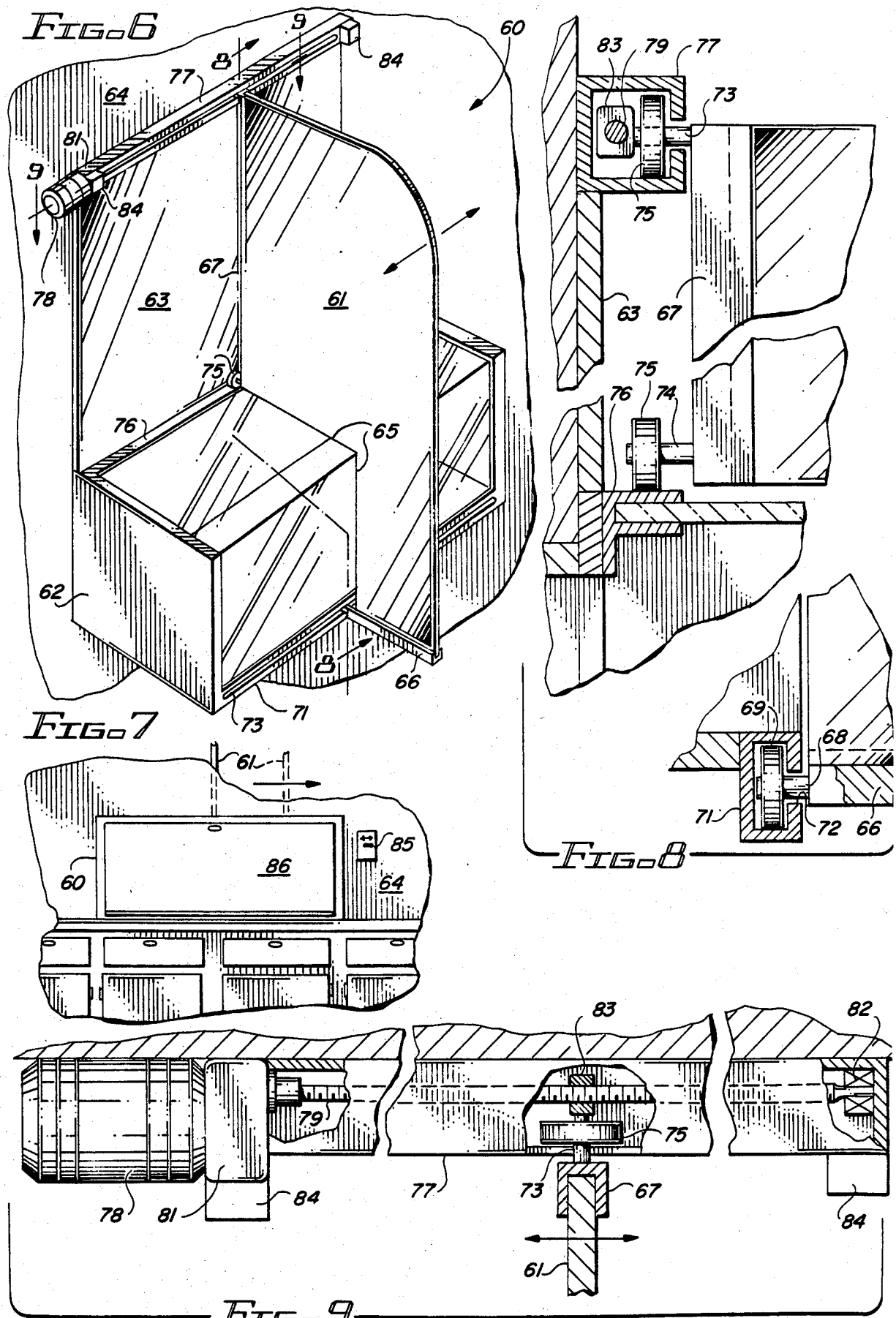

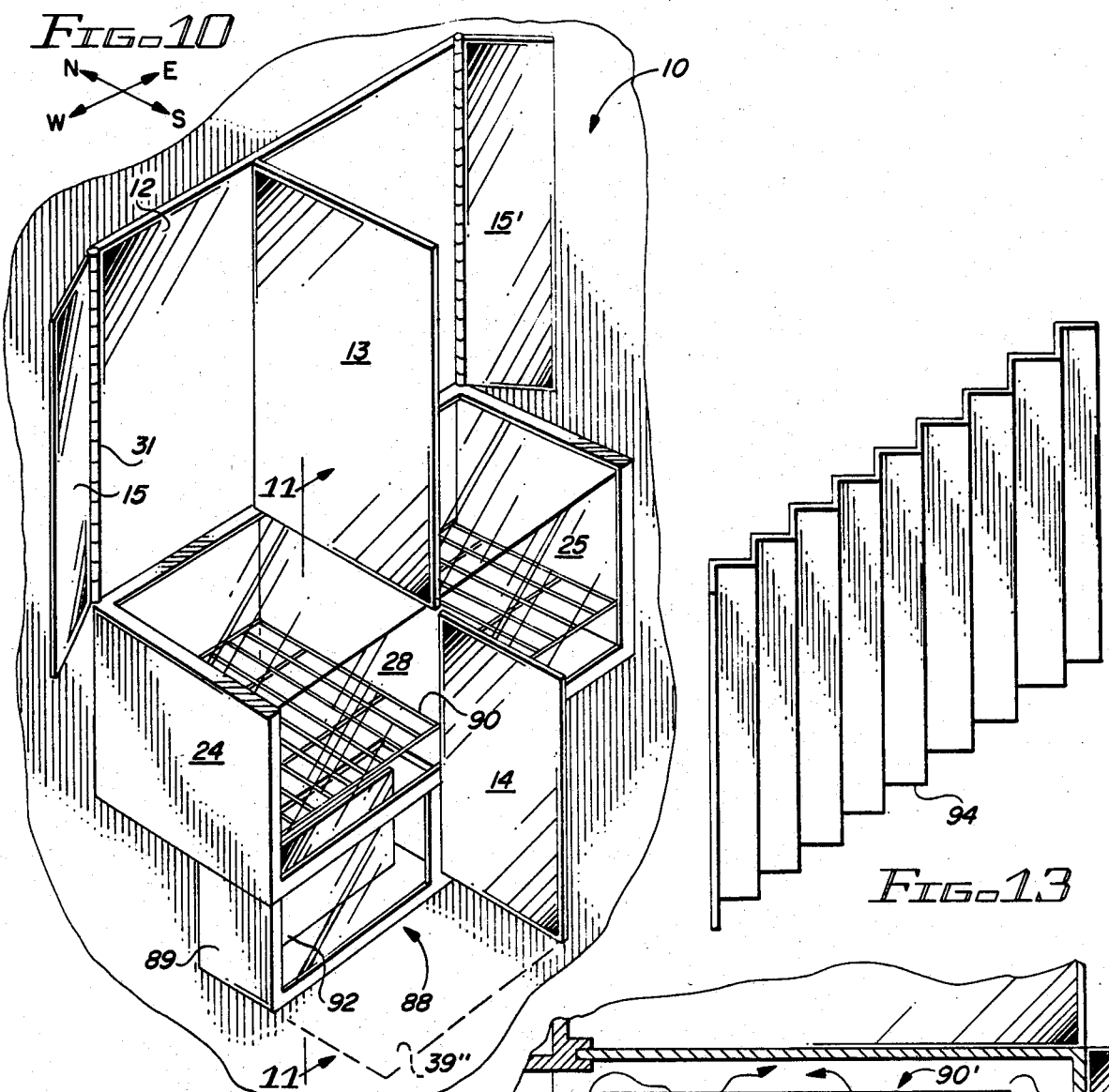
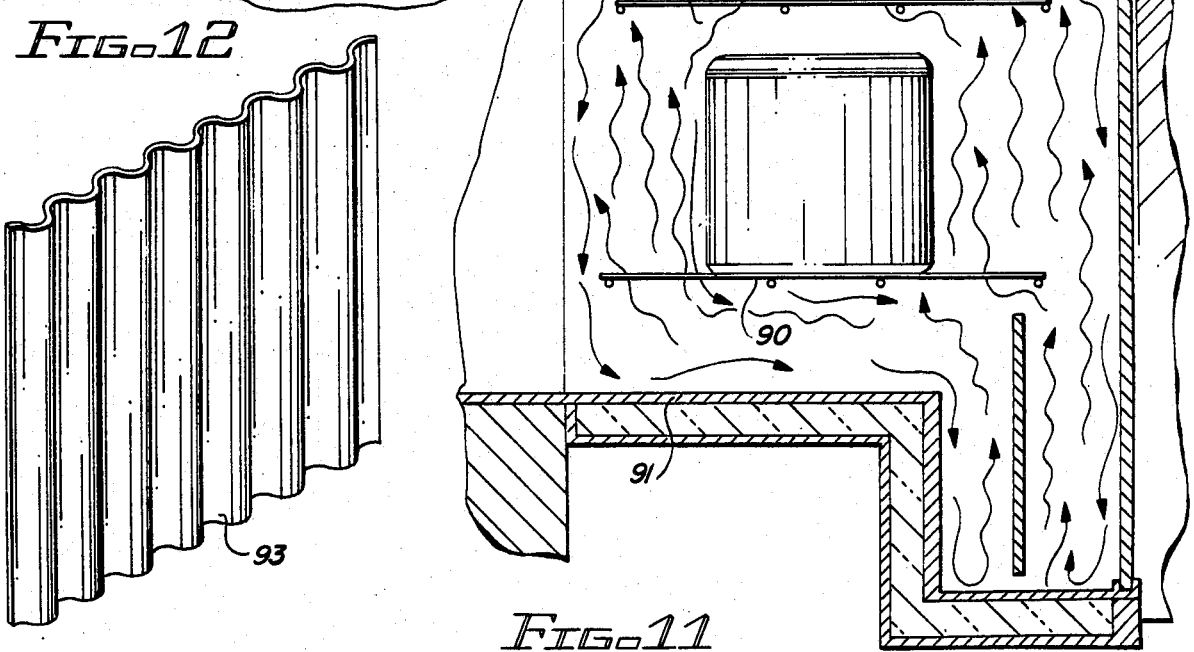

THROUGH THE WALL SOLAR COOKER

BACKGROUND OF THE INVENTION

The recently aroused public interest in fossil fuels, the over-consumption of firewood, the burning of waste matter and the rise in electrical energy costs, have prompted an increased interest in solar energy. The primary focus of such interest and the technical endeavors that have followed have been primarily in the area of home heating, solar water heaters and solar cookers. Solar cookers have been limited to portable types that are periodically oriented for continuous exposure to the sun.

The development of an indoor solar oven or cooker as an appliance that supplements the ordinary gas and electric range had to contend with the difficulty of capturing the solar rays of the sun, and making them available to the solar cooker on a continuous basis throughout the daylight hours.

The present invention employs a new approach for dealing with these problems, providing a cooker or oven that may be installed to extend through an outside wall of a kitchen with the device operated from inside or outside of the kitchen.

DESCRIPTION OF THE PRIOR ART

Portable solar cookers are known and described in U.S. Pat. Nos. 4,203,427; 4,077,391 and by 4,236,508.

U.S. Pat. Nos. 4,212,288 and 4,149,520 disclose means for transmitting solar energy through a window to heat the living space of a building.

U.S. Pat. No. 4,018,212 discloses a housing permanently stationed inside a residential structure with the housing incorporating a liquid heat transfer medium, a radiation receiver in heat exchange contact with the medium and a heating and cooking surface in heat exchange relationship with the medium. A radiation pipe extends through the exterior wall of the building to deliver a concentrated beam of solar radiation to the radiation receiver.

SUMMARY OF THE INVENTION

In accordance with the invention claimed, a new and improved through the wall solar cooker or oven is provided for use as a permanently installed kitchen appliance having reflective means mounted outside of the building for capturing solar radiation throughout the daylight hours and for introducing it into the oven or cooker.

It is, therefore, one object of this invention to provide a new and improved solar oven or cooking appliance.

Another object of this invention is to provide a new and improved through the wall cooker employing reflectors arranged to passively reflect sufficient sunlight for cooking purposes regardless of the position of the sun due to the time of day or season of the year.

A further object of this invention is to provide a new and improved through the wall solar cooker which may employ user adjustments for varying the amount of solar radiation that is introduced into the oven, thereby adjusting the operating temperature of the oven.

A still further object of this invention is to provide a new and improved through the wall solar cooker that may be loaded, operated, adjusted and unloaded from inside the kitchen.

A still further object of this invention is to provide a solar cooker extending through the wall of a building employing means for capturing solar radiation that is adjustable for accommodating the constantly changing orientation of the sun throughout the day and the seasons of the year, and which oven may be loaded and unloaded from inside and outside of the building.

A still further object of the invention is to provide such a solar cooker that may be economically built and assembled for use in new or existing buildings.

Further objects and advantages of the invention will become apparent as the following description proceeds, and the features of novelty which characterize the invention will be pointed out with particularity in the claims annexed to and forming a part of this specification.

BRIEF DESCRIPTION OF THE DRAWINGS

The present invention may be more readily described with reference to the accompanying drawings, in which:

FIG. 1 is a partial perspective view of a through the wall solar cooker embodying the invention and showing that portion of the cooker projecting through the kitchen wall;

FIG. 2 is a cross-sectional view of FIG. 1 taken along line 2—2;

FIG. 3 is a horizontal cross-sectional view of a further embodiment of the invention;

FIG. 4 is a partial perspective view showing a perforated variation of a reflective panel that may be incorporated in the oven of FIGS. 1 and 2;

FIG. 5 is a partial perspective view illustrating how the position of a reflective panel may be altered to accommodate various positions of the sun or to achieve different levels of heating inside the cooking structure;

FIG. 6 is a perspective view showing another embodiment of the invention in which a reflective panel is supported by rollers which permit the panel to be moved to different positions;

FIG. 7 is a perspective view showing that portion of the cooker of FIG. 6 as seen from inside the kitchen;

FIG. 8 is a segmented cross-sectional view of FIG. 6 taken along the line 8—8;

FIG. 9 is a segmented partially cross-sectional view of FIG. 6 taken along line 9—9;

FIG. 10 is a perspective view similar to FIG. 1 of a through the wall solar cooker employing a solar heat concentrator mounted below the oven for directing heat into the base of the oven;

FIG. 11 is a cross-sectional view of FIG. 10 taken along the line 11—11;

FIG. 12 is a perspective view of a corrugated solar ray absorbing plate for use in the concentrator shown in FIGS. 10 and 11; and FIG. 13 is a perspective view of a modification of the solar ray absorbing plate shown in FIG. 12.

DESCRIPTION OF THE PREFERRED EMBODIMENT

Referring more particularly to the drawings by characters of reference, FIGS. 1 and 2 disclose a solar oven or cooker 10 defining an oven and cooking compartment 11 and reflective panels 12, 13, 14, 15 and 15'.

Cooking compartment 11 in the form of a rectangular box projects outwardly from the inside of a kitchen through an outside wall 16 of a dwelling where it is exposed to the atmosphere. The opening of the cooking compartment into the kitchen, which is herein referred to as the front of the cooker, may be flush with the outside surface 17 of wall 16 and closed by a thermally insulated door 18 as shown in FIG. 2. A further door 18' arranged flush with the inside surface 17' of wall 16 may be provided, if so desired. A wall 19 at the center of compartment 11 divides compartment 11 into left and right cooking ovens or cells, 21 and 22, respectively, as viewed from inside of the kitchen. Bottom and end walls 23, 24 and 25, respectively, of compartment 11, are thermally insulated and preferably surfaced inside compartment 11 with reflective material for directing the light on to the cooking vessels where it is converted to heat in the vessel, directly in contact with the food adjacent its inner surface. If desired, heat absorbing plates may be positioned below the cooking pots or vessels, both in the form of a blackened tray and in the form of blackened troughs, directing heat upward into the cooking chamber. Wall 19 has a thermally insulating core and reflective plates on both of its outside surfaces. The inside surface of door 18 is also surfaced with a reflective plate. The top of compartment 11 extending outside of wall 16 is covered by a glass, nontoxic plastic or fiberglass plate 26 that may be transparent or not and consist of one, two, or more layers of glazing. The portion of plate 26 inside of wall 16 is covered by an insulated panel 27 as shown in FIG. 2. The outside exposed wall 28 of compartment 11 is also formed of a suitable glass, nontoxic plastic or fiberglass and if desired, having layers of glazing.

Reflective panel 12 extending the full width of compartment 11 and approximately twice its height, is mounted flush against the outside surface of wall 16. Its lower edge rests upon the top surface of compartment 11.

Reflective panels 15 and 15' are equal in height to panel 12, but considerably narrower in width. Panel 15 has its right edge attached to the left edge of panel 12 by any suitable means such as, for example, a hinge 31 and panel 15 has its left edge attached to the right edge of panel 12 by similar means 32.

Panel 13 is equal in height to panel 12, and its width matches the projection of compartment 11 outside of wall 16. It is mounted vertically over the center of compartment 11, directly over wall 19 and perpendicular to panel 12 and plate 26. The bottom edge of panel 13 rests directly upon plate 26 and its forward edge 33 rests against the surface of panel 12.

Reflective panel 14 is coplanar with panel 13, extending outwardly from the center of rear wall 28 of compartment 11. Its height is equal to the height of compartment 11, and its width is somewhat less than the width of panel 13.

Both faces of each of panels 13 and 14 are reflective, while only the rearward surfaces, i.e. those surfaces that are exposed to the sun, of panels 12, 15 and 15' are reflective. Panels 12, 13, 14, 15 and 15' may be formed of polished or coated metal or other forms of front surface reflectors.

The preferred directional orientation of cooker 10 is indicated by the N/S, E/W arrows 34 shown in FIG. 1, i.e. cooker 10 should be mounted in a wall 16 that faces south. With such an orientation, the rays of the morning sun, as represented by arrows 35, strike the right or far side of panel 13, and are reflected downwardly through plate 26 into cell 21 where they are absorbed by the heat absorbing plate covering wall 23 or by cooking vessels within the oven chamber, cell 21. As the sun rises toward the overhead position at midday, the rays of the sun pass directly through glass plates 26 and 28 into both cells 21 and 22. As noon approaches, the sun's rays 36 also strike panel 12 at both sides of panel 13 and are reflected downwardly through plate 26 into both cells 21 and 22. As noon approaches, rays incident upon panel 15 also may be reflected downwardly into cell 22 when panel 15 is pivoted slightly forward as shown in FIG. 1. Similarly, as the sun passes its high noon position, rays incident upon panel 15' may be reflected into cell 21. Panel 14 makes its maximum contribution in early morning when incident rays 37 are reflected from its right-hand face to pass through rear wall 28 into cell 21, and in late afternoon when the rays 38 of the setting sun are reflected from the rear or left-hand face of panel 14 into cell 22.

It will be noted from the foregoing discussion, that when panels 13 and 14 are fixed in the center position as shown in FIG. 1, the two cells 21 and 22 are essentially morning and afternoon cells, respectively. That is, cell 21 is the hotter of the two in the forenoon and cell 22 is the hotter cell in the afternoon. Depending upon the cooking job at hand, the person doing the cooking has the option of selecting the cell that is most appropriate for the task at hand. There is also the option of adjusting the pivotal positions of panels 15 and 15' for a measure of control over the effectiveness of these panels in capturing the sun's rays. The optimum positions for these panels will be found to vary with the seasons of the year.

The thermal capacity of cooker 10 or its capability for capturing a maximum amount of solar radiation may be further enhanced by extending panel 13 rearward or outwardly as indicated by broken line 39 in FIG. 2, and/or placing a horizontally positioned reflective panel 39' at the bottom of the unit shown in FIG. 1, and panel 39" shown in FIG. 11. It will be recognized that these variations will further accentuate the temperature differences between cells 21 and 22.

Cooker 10 as shown in FIGS. 1 and 2, thus is seen to provide for the efficient collection of solar radiation throughout the day by virtue of its ability to gather the sun's rays by reflection when the position of the sun does not permit a high degree of direct entry; and it offers a range of operating temperatures which may be selected through the choice of the left or right cell 21 or 22 of the oven or cooker, or by picking the most appropriate time of day to perform a particular cooking operation.

A number of variations from the basic cooker 10 of FIGS. 1 and 2 are offered as further embodiments of the invention with a solar heat concentrator being added to the solar oven of FIGS. 1 and 2 in the embodiment shown in FIGS. 10 and 11.

FIG. 3 illustrates a variation of the oven shown in FIGS. 1 and 2 incorporating a triangular rather than a rectangular projection of compartment 11 from the outside of wall 16. As shown in this top cross-sectional view, solar cooker 40 incorporates a reflective panel 12', and central two-sided reflective panels 13' and 14', all of which are essentially identical with panels 12, 13 and 14 of FIGS. 1 and 2. In this embodiment, a triangular projection 41 forms the cooking compartment and its geometrical configuration is particularly appropriate because it tends to coincide with the area over which the reflected rays of the sun are concentrated.

FIG. 4 illustrates a solar cooker 43 comprising a cooking compartment 11' and a reflective panel 12', both of which are essentially the same as compartment 11 and panel 12 of cooker 10. In this embodiment, however, a perforated reflective panel 44 is substituted for the continuous panel 13. Panel 44 is reflective on both sides thereof, and is provided with a plurality of openings or perforations 45 extending therethrough in a uniform manner over most of its surface, although the perforations may be randomly spaced and still fall within the scope of this invention. Slots 46 are formed in and spacedly arranged along its lower edge to permit passage of a portion of the sun's rays 47, which would otherwise be reflected downward into cell 21, pass through perforations 45 and slots 46 into cell 22. In the afternoon, in the same manner, radiation that would otherwise be directed into cell 22 will pass through the perforations into cell 21. This arrangement tends to moderate the temperature difference between the two cells 21 and 22 during the day.

Solar cooker 50 of FIG. 5 embodies other features of a through the wall cooker. In place of the fixed reflective panel 13 of cooker 10, a movable double-sided reflective panel 51 is employed. A pair of pins 52 extending downwardly from the lower edge of panel 51 may be selectively inserted in mating pairs of holes 53 that are provided along the forward and rear edges 54 and 55, respectively, of the protruding top surface of cooking compartment 11″. Although the cooker is shown as a single rectangular oven structure, it may have any width and still fall within the scope of this invention. During one use of the oven, the reflector may rest at the west edge during the forenoon and at noon moved to the east edge of the oven. Mid position uses of the reflector are possible for more detailed control of the cooking effect.

This mounting means for panel 51 permits its position to be altered to change the operating characteristics of cooker 50. If it is desired, for example, to utilize the entire compartment 11″ during the forenoon, panel 51 may be moved all the way to the west end of compartment 11″. In this position, the reflective surface on its eastern face would reflect into the entire cooking compartment 11″. In the same manner, an afternoon cooker could be obtained by moving panel 51 all the way to the east end of compartment 11″ so that its western face would reflect into compartment 11″. Selection of an intermediate position in either case would tend to produce a lower cooker temperature. The position of panel 51 might thus be chosen as a means for controlling cooker temperature as appropriate for a given cooking operation.

As shown in FIG. 5, a movable reflective panel 56 also may be employed in place of fixed panel 14 of FIGS. 1 and 2. Wire clip means 57 extending from both sides of the upper corner of panel 56 may be inserted in holes 53 as indicated in dash lines. A similar clip at the bottom corner of panel 56, not shown in the drawing, is inserted into aligned holes 58 that are provided at the bottom edge of compartment 11″. Panel 56 thus may be moved to any desired position along with panel 51 for further control over the operating characteristics of the solar oven.

FIGS. 6-9 illustrate yet another variation of the invention in which a solar cooker 60 embodying the principles of cookers 10 and 50 further incorporates a means by which a movable, double-sided reflective panel 61 may be moved to the east or to the west from the inside of the kitchen.

The solar cooker 60 incorporates a cooking compartment 62 that is identical with compartment 11 of cooker 10, except for the absence of a central wall 19. In addition, it has a reflective panel 63 similar to panel 12 of cooker 10 that is positioned above compartment 62 against wall 64 in which cooker 60 is mounted.

Movable panel 61 represents a combination of panels 13 and 14 of cooker 10 with panel 13 extended to broken line 39 of FIG. 2. A rectangular cutout 65 at the lower inboard corner of panel 61 provides clearance for compartment 62 as panel 61 is moved east or west across the width of compartment 62.

The lower horizontal edge and the vertical upper inboard edge of panel 61 are secured within and reinforced by U-shaped channels 66 and 67, respectively.

A rod 68 extending longitudinally from the inboard end of channel 66 serves as an axle for a roller 69.

An enclosed channel or raceway 71 extends along the width of compartment 62 at its lower outboard edge. A horizontal slot 72 along the length of the vertical outer face of channel 71 provides clearance for rod 68; otherwise, channel 71 is completely enclosed and serves as an enclosed track or raceway along or within which roller 69 is rotationally operative.

Two additional rods 73 and 74 extend perpendicularly from the upper and lower ends, respectively, of channel 67. Rods 73 and 74 are parallel with rod 68, each carrying a wheel 75 that is identical with wheel 69. Wheel 75 of lower rod 74 rides upon a flat horizontal open track 76 that extends along the lower edge of panel 63. Wheel 75 of upper rod 73 rides inside an enclosed channel or raceway 77 that is similar to track 71, but somewhat wider. Track 77 is secured to the top edge of panel 63, extending across the full width of panel 63.

A reversing motor 78 is mounted coaxially with track 77 at one end thereof. A threaded shaft 79 which is coupled at one end to motor 78 via a speed reducing gear box 81 extends longitudinally through track 77, its opposite end being rotationally supported by a bearing 82 at the far end of track 77. The end of rod 73 that extends through roller 75 is welded or otherwise secured to a block 83. Threaded shaft 79 passes in mating relationship through a threaded hole in block 83 so that as shaft 79 is rotated by motor 78 and gear box 81, block 83 moves to the left or to the right along shaft 79, carrying with it rod 73 and panel 61. By virtue of its mounting upon rollers 69 and 75, panel 61 is free to be moved in an easterly or westerly direction along channels 71 and 77 and track 76, the direction being dependent upon the rotational direction of reversing motor 78.

At each end of channel 77 is a sensor or limit switch 84. If panel 61 is moved all the way to one end of channel 77, it strikes the limit switch 84 at that end, the switch then interrupting motor operation to prevent further movement of panel 61 in that direction. The motor 78 is then operative only in the opposite direction until the panel 61 has been moved away from the limit switch 84 that has just operated.

As shown in FIG. 7, a control switch 85 for motor 78 is mounted inside the kitchen wall 64 adjacent the door 86 of cooker 60. Switch 85 is preferably a three-position toggle switch, the three positions including a position to the left for moving panel 61 to the left, a position to the right for moving panel 61 to the right, and a center rest position for which motor 78 is not energized. The left and right positions of switch 85 are preferably momentary, that is, the switch must be held in those positions, or it will return by itself to the center rest position.

The motor-operated panel 61 thus affords to the user of cooker 60 a convenient means for adjusting the operating characteristics of the cooker 60 as appropriate to accommodate the changing locations of the sun or the specific requirements of the cooking job at hand. By opening the oven door, the operator can view the position and motion of the panel 61 as it is moved under the control of switch 85.

Although the solar cooker or oven has been shown as being opened from inside of the kitchen, it should be noted that glass panels 25 and 28 of FIG. 1 may comprise hingedly mounted doors which thereby permits the solar device to be opened from either inside or outside of the building.

As a further aid to uniformly heating the inside of cooker 10, and any of the other modifications of the through the wall solar cookers disclosed herein, a solar heat concentrator 88 may be employed. This concentrator is shown in FIGS. 10 and 11 as being added to cooker 10, as shown in FIGS. 1 and 2, wherein like structural parts are given the same reference characters.

This concentrator comprises an open-face heating trough 89 that extends downwardly from the bottom 23 of cooking compartment 11, a predetermined distance and opens at its upward end into the southern most portion of the base of compartment 11. The oven compartment is provided with racks 90 and 90' mounted above a false bottom partition 91, such that any heat absorbed by trough 89 will be directed upwardly through the bottom of the oven compartment and around the bottom of the pot or vessel utilized to hold the food being cooked.

The inside of the trough may be covered by a blackened heat-absorbing surface. If desired, a flat or convex corrugated surface 92, arranged along the back of the inside surface of the trough, or as shown in FIGS. 10 and 11, spaced from the back surface, may be employed to aid in directing the heat from the trough up into the oven and particularly around the base of the cooking vessel for more uniform heating thereof and the total volume of the oven compartment.

It should be noted that in a normal solar box oven or cooker, during the warm-up period, heat tends to rise from the top of the cooking pot or vessel and from the dark colored tray and it tends to pocket at the top of the oven just under the glazing, stratifying in layers downwardly therefrom in the oven. Because the vessel or pot is cold, air flows along the sides of the vessel or pot downwardly resulting in convection activity, thus maintaining the heated air at the top of the oven or cooker.

As heat increases at the top of the pot, rising hot air sets up a rising column of air above the pot with little force to move the air under the pot. Further, multiple pots shadow each other as well as impede air circulation around and under the pots.

In order to eliminate the cool air pockets at the bottom of the oven and at the base of the pots arranged therein, the solar heat concentrator 88 has been provided.

This solar concentrator serves as a warming trough which collects and concentrates solar heat causing the collected resulting heat to rise in the trough and directed to flow into the oven underneath the pots in the oven. The trough also provides a well where the cold air in the oven can drain from under the pot to be replaced by the warmer air from the trough and the stratified hot air from above the pots at the top of the oven.

Thus, the convection flow of hot air is from the black surface of the trough and/or the spaced barrier 92 upwardly into the bottom of the oven. This can rise to the top of oven or be directed under the vessels and pots or both. The pot needs to set up high enough in the oven from the base, not only to be in the hot air at the top of the oven, but high enough to allow cold air to flow out from under the pot into the trough 89. Other air convection forces occur from the dark pot or vessels upwardly, further stirring and moving the air in the oven.

FIGS. 12 and 13 illustrate further design configurations of surface 92 of FIGS. 10 and 11. In FIG. 12, surface 93 may have an arculate shape, while in FIG. 13, surface 94 may be more peaked, having sharp crests and valleys.

A practical and controllable solar cooker is thus provided for use as an appliance in the normal kitchen environment in accordance with the stated objects of the invention, and although but a few embodiments of the invention have been illustrated and described, it will be apparent to those skilled in the art, that various changes and modifications may be made therein without departing from the spirit of the invention or from the scope of the appended claims.

What is claimed is:

1. A solar appliance for extending from the interior of a kitchen through an exterior wall of the building and beyond a predetermined distance in a cantilever manner to receive and concentrate in the appliance outside of the building, solar radiation rays for cooking purposes comprising:
   a housing,
   said housing being mounted to extend from a kitchen through an external wall of a building and beyond in a cantilever manner and forming a closed oven,
   said oven comprising a bottom, glass top, a pair of sides and a first end positioned with access from within the kitchen and comprising an oven door,
   a first reflective panel member mounted above, juxtapositioned to one edge of said glass top for positioning against the outer surface of the external wall and extending laterally therefrom for receiving and directing solar rays impinging thereon through said glass top and into said oven, and
   a second double-sided reflective panel mounted above and juxtapositioned to said glass top and extending substantially perpendicular to said first reflective panel for receiving solar rays impinging on either side thereof, and directing said solar rays into said oven.

2. The solar appliance set forth in claim 1 wherein:
   said oven comprises another end spaced from said first end with said first end being glazed on its inside oven surface.

3. The solar appliance set forth in claim 2 wherein:
   said another end comprises another oven door.

4. The solar appliance set forth in claim 2 wherein:
   said another end being a glass panel.

5. The solar appliance set forth in claim 4 in further combination with:
   a third panel mounted to extend laterally outwardly from said other end of said oven to direct solar rays into said oven.

6. The solar appliance set forth in claim 5 wherein:
   said third panel comprises an integral part of said second panel.

7. The solar appliance set forth in claim 4 wherein:

said oven comprises a pair of cells, each comprising a separate isolated cooking area.

8. The solar appliance set forth in claim 1 wherein:
said second panel is adjustably positionable in one of a number of parallel arrangements between said sides.

9. The solar appliance set forth in claim 1 in further combination with:
a first track mountable on the exterior wall of the building along the top edge of said second panel,
a threaded rod journaled in said first track for rotation therein,
means connected to said second panel and in threaded connection with said rod, and
a reversing motor means connected to said rod for rotation thereof for selectively moving said means and said second panel along said rod.

10. The solar appliance set forth in claim 9 in further combination with:
a second track means mountable on said housing along the bottom edge of said panel, and
roller means mounted on the bottom edge of said second panel and operable in said second track means for guiding said second panel upon movement thereof by said motor means.

11. The solar appliance set forth in claim 9 in further combination with:
electrical switching means mountable in the kitchen and interconnecting said motor means with a source of electrical power for actuation thereof.

12. The solar appliance set forth in claim 1 wherein:
said second panel is provided with a plurality of perforations extending therethrough for passage of a portion of the sun's rays impinging on either side thereof.

13. The solar appliance set forth in claim 1 wherein:
said housing comprises a rectangular configuration.

14. The solar appliance set forth in claim 1 wherein:
said oven comprises a triangular configuration with the apex of said triangle extending outwardly of the building.

* * * * *